Patented Oct. 9, 1951

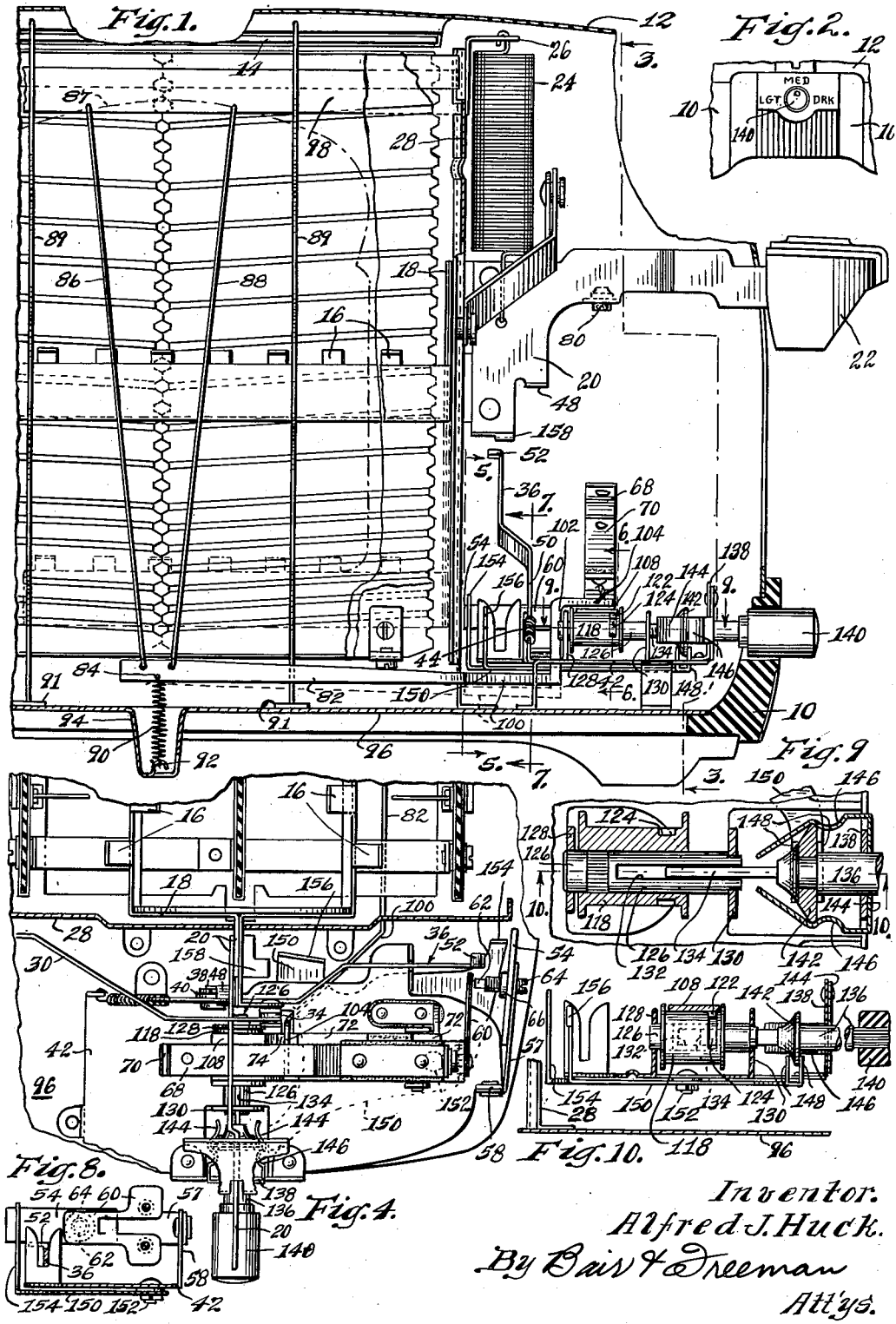

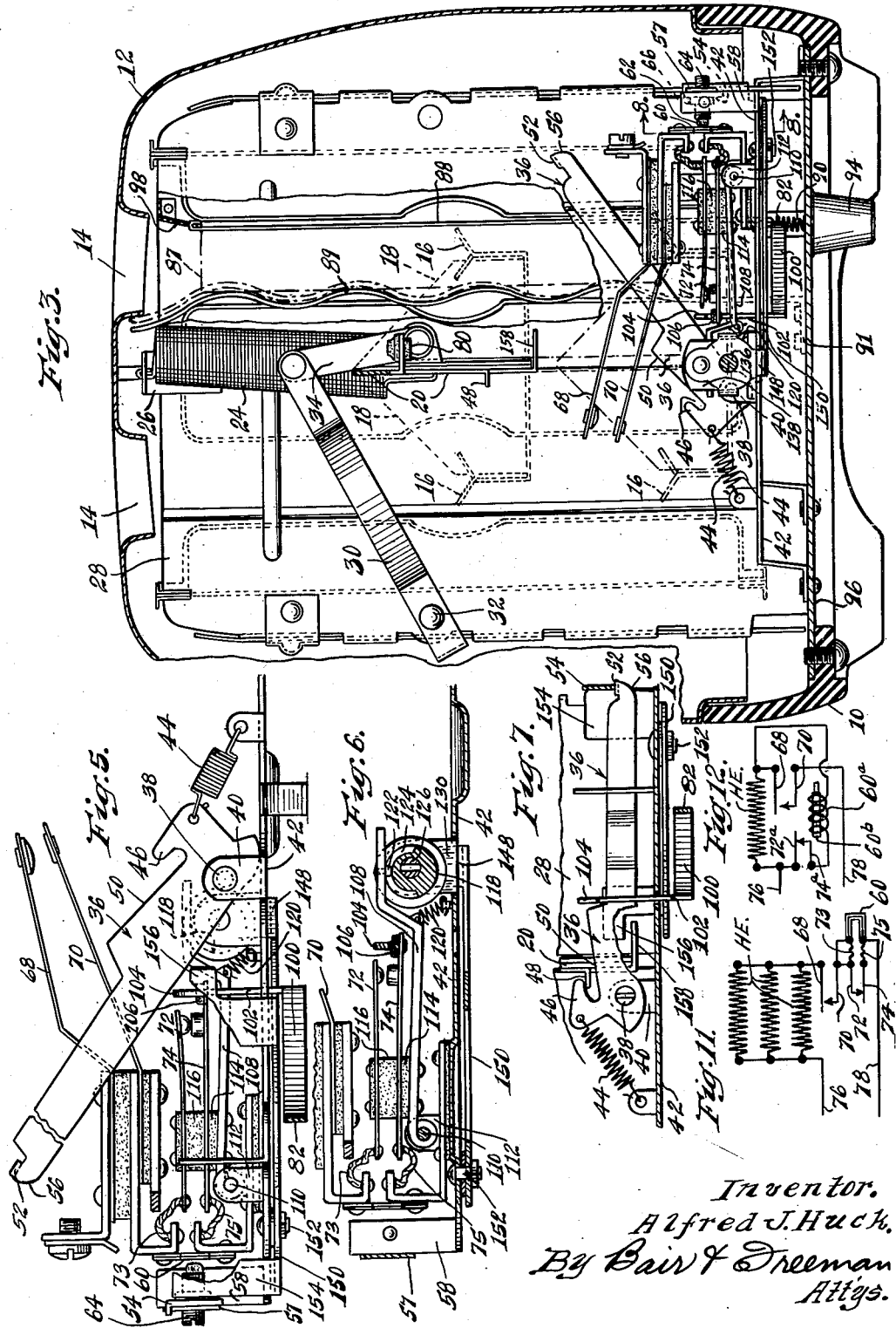

2,570,453

UNITED STATES PATENT OFFICE 2,570,453

TEMPERATURE ACTUATED CONTROL

Alfred J. Huck, St. Louis, Mo., assignor to Knapp-Monarch Company, St. Louis, Mo., a corporation of Delaware Application December 28, 1949, Serial No. 135,391

6 Claims. (Cl. 99—329)

This invention relates to a temperature actuated control device and particularly one adapted for controlling a bread toaster in accordance with the surface temperature of the bread itself.

One object of the invention is to provide a conduction heat control device wherein the surface temperature of the bread is actually conducted to control elements for causing expansion thereof in accordance with the bread temperature, the expansion of the elements being utilized to actuate a movable element that terminates the toasting cycle.

Another object is to provide a conduction heat actuated device in the form of a pair of metallic wires having different coefficients of expansion against which the bread is held in surface contact so that the wires take on the bread temperature and expand in accordance therewith, the wires being connected to a lever for swinging it in accordance with the temperature changes and the lever being operatively connected with a releasing mechanism for the toaster to release a bread carrier and effect opening of the main switch for the heating elements of the toaster.

Still another object is to provide a simplified construction of thermal responsive device comprising a pair of wires having a differential of expansion, against which wires the bread is held so that the wires respond to the surface temperature of the bread as it is toasted, a lever being connected with the wires and a spring being utilized to hold the wires taut and permit pivoting of the lever for actuating purposes in response to differential expansion of the two wires.

A further object is to provide means operated by the lever for terminating a toasting cycle which means requires but little energy for its operation and may be electrically operated by the circuit supplying the heat elements of the toaster for accomplishing the release of a mechanical latch for the bread carrier and main switch of the toaster.

With these and other objects in view, my invention consists in the construction, arrangement and combination of the various parts of my temperature actuated control, whereby the objects contemplated are attained, as hereinafter more fully set forth, pointed out in my claims and illustrated in the accompanying drawings, wherein:

Figure 1 is a vertical longitudinal sectional view through a toaster showing my control device in association therewith.

Figure 2 is a fragmentary end view of the lower right hand corner of Figure 1 to show a dial associated with an adjusting knob.

Figure 3 is a vertical sectional view on the line 3—3 of Figure 1.

Figure 4 is a plan view of the operating mechanism shown in front of the toaster compartment in Figure 3.

Figure 5 is an enlarged vertical sectional view on the line 5—5 of Figure 1.

Figure 6 is an enlarged vertical sectional view on the line 6—6 of Figure 1.

Figure 7 is a vertical sectional view on the line 7—7 of Figure 1 showing the bread carrier in lowered and latched position.

Figure 8 is a sectional view on the line 8—8 of Figure 3 showing a thermal latch release.

Figure 9 is an enlarged sectional view on the line 9—9 of Figure 1 showing a manual control device.

Figure 10 is a reduced sectional view on the line 10—10 of Figure 9.

Figure 11 is an electro-diagrammatic view showing the elements of the control device in relation to the heating elements of the toaster; and Figure 12 is a similar diagrammatic view showing a modified form.

On the accompanying drawings I have used the reference numeral 10 to indicate a base frame preferably molded of insulating material, and 12 a toaster casing which may be formed of sheet metal. The casing 12 has therein a pair of slots 14 for receiving the bread and below these slots bread carriers 16 are provided supported by end brackets 18, one of which has an extension 20 terminating in a control handle 22 for depressing the bread carriers. The carriers are normally held in the raised position by a spring 24 connected at its upper end to a stationary bracket 26 on a front wall 28 of the toasting chamber and at its lower end to the bread carrier extension 20.

To insure that both ends of the bread carriers are raised and lowered simultaneously, a U-shaped lever 30 extends along one side of the toasting chamber and has arms at its ends pivoted on rivets 32 carried by the ends of the toasting chamber, the outer ends of the arms in turn being connected by links 34 with the extension 20 and a similar extension at the other end of the bread carriers (not shown).

The bread carriers are adapted to be held in lowered position by a latch lever 36 pivoted at 38 (see Figure 5) to a bracket 40 extending upwardly from a base plate 42. This base plate is for the purpose of mounting the elements of my control device as will hereinafter appear.

The latch lever 36 is normally held in the raised position of Figures 3 and 5 by a spring 44 and has a hook 46 to engage over a finger 48 of the bread carrier extension 20 as shown in Figure 7 when the bread carrier is lowered. The finger 48, during the lowering operation, engages a top surface 50 of the latch lever 36 for the purpose of depressing the latch lever against the bias of the spring 44 and swinging a latch lug 52 thereon under a latch 54, the lever being cam-shaped at 56 for this purpose. The latch 54 is carried by a leaf spring 57 as shown in Figure 4 and is normally biased toward the left for assuming a position over the latch lug 52 as in Figure 7. The leaf spring 57 is connected to a bracket 58 of the base plate 42.

I provide an automatic actuator for the latch 54 in the form of a piece of bimetal 60 cut to U-shape as shown in Figure 8. When this bimetal element is heated by current passing therethrough, it warps toward the right in Figure 4 for engaging a ceramic insert 62 of an adjusting screw 64 threaded in a boss 66 of the latch 54. The bimetal actuator is thus insulated from the latch yet engages the insert 62 for mechanically moving the latch to an unlatched position.

For automatically actuating the bimetal element 60 which may be termed a "thermal motor," I provide a circuit shown in Figure 11 which includes the heating elements HE of the toaster, a main switch comprising switch blades 68 and 70 and a shunt switch comprising blades 72 and 74. Current supply wires are indicated at 76 and 78. It will be noted that the heating elements and the switch blades are arranged in a series circuit. Accordingly, when the main switch 68—70 is closed, the heating elements will be energized and when thereafter the shunt switch 72—74 is opened, the current will flow through the bimetal motor 60 for heating it whereas initially when the switch 72—74 is closed, it shunts the current from passage through the bimetal. Accordingly, the bimetal will become heated when the shunt switch is opened and will warp to a position for releasing the latch 54 from the latch lever 36.

The main switch 68—70 is shown open in Figure 3. It is closed by a ceramic insert 80 carried by the bread carrier extension 20 engaging the blade 68 and closing its contact against the contact of the blade 70 in an obvious manner when the bread carrier is depressed.

For automatically opening the shunt switch 72—74, I provide a conduction heat control lever 82 (see Figure 1) which is pivoted at 84 and has connected therewith a pair of metallic wires 86 and 88. The pivot 84 is represented by the upper end of the spring 90, the lower end of which is anchored as at 92 in a depression 94 of a bottom cover plate 96 of the toaster and the upper ends of the wires 86 and 88 are anchored to a sheet metal channel member 98. The wire 86 has a low thermal expansion coefficient and may be made of Nilvar or the like. The wire 88 has a high thermal expansion coefficient and may be made of stainless steel or the like. Thus upon temperature rise, greater expansion of the wire 88 than the wire 86 will cause the right hand end of the lever 82 in Figure 1 to lower as shown by dotted lines. If it is desirable for this end to be raised instead of lowered, the wires 86 and 88 may be reversed.

In order to hold the slice of bread 87 against the wires 86 and 88, I provide a resilient holder wire 89 anchored at the lower end as shown at 91 and its upper end normally engaging the flange 14 as shown by dotted lines in Figure 3. When the slice of bread is inserted it bends the holder wire 89 to the full-line position and the resiliency of the wire thus holds the slice of bread with its surface in contact with the thermal responsive wires 86 and 88. The wire 89 may be corrugated as illustrated in order to provide a series of spaced point contacts thus giving maximum assurance of contact of the bread throughout the extent of the wires 86 and 88.

The lever 82 as shown in Figure 4, has an angular extension 100 terminating in an upward extension 102 having a right angle arm 104 overlying the switch blade 74. Thus the lowering of the lever to the dotted position of Figure 1, which position is also shown by solid lines in Figure 6, opens the switch 72—74 thereby energizing the bimetal element 60 for terminating the toasting cycle by releasing the latch 54 from the latch lever 36.

To adjust the toaster timing, the switch blades 72 and 74 are connected to the terminals of the bimetal motor 60 by flexible leads 73 and 75 which permits the initial spacing between the lever end 104 and the switch blade 74 to be adjusted as shown in Figure 6. The switch blade 74 carries a ceramic insert 106 so that there is no electrical contact between the blade and the element 104. Both blades 72 and 74 are mounted on a bracket 108 pivoted at 110 to an ear 112 extending upwardly from the base plate 42, insulators 114 and 116 being used to insulate the blades from each other and from the bracket 108.

The free end of the bracket 108 is held engaged with an eccentric 118 by a spring 120 and carries a stop pin 122 operable in a slot 124 of the eccentric to limit rotation of the eccentric to about one half turn. The eccentric 118 as shown in Figures 9 and 10 is mounted on a shaft 126 supported in brackets 128 and 130. The shaft is slotted at 132 to slidably receive a blade 134 of an adjusting shaft 136 which is journalled in a bracket 138 and terminates in a control knob 140. The knob 140 as shown in Figure 2, cooperates with indicia on the base 10 to indicate the toast color. When the eccentric 118 is adjusted to raise the bracket 108 in Figure 6, the timing is short for light toast and when it is rotated the other way for lowering the bracket, it takes longer for the lever end 104 to reach the ceramic insert 106 and the toast color is darker.

It is also desirable to utilize the control knob 140 for either manually releasing the bread carriers independent of the automatic release or holding them in a lowered position while permitting the toaster cycle to be automatically terminated when it is desirable to keep the finished toast warm by preventing it from being elevated partially out of the toaster thus absorbing the residual heat from the heating elements. This is accomplished by adapting the knob 140 to release the bread carriers when pushed inwardly and to lock them against complete upward movement when pulled outwardly.

For this purpose, a flange 142 is provided on the shaft 136 and is normally in the position shown in Figure 9 with relation to a U-shaped leaf spring 144. When the flange is pushed toward the left in Figure 9, the terminal ends of the leaf spring tend to force it back whereas when it is pulled to the right, it will snap over detents 146 of the leaf spring and remain in the pulled-out position.

The flange cooperates with a U-shaped end 148 of a lever 150 as shown in Figure 10 which is pivoted at 152. The shape of this lever is shown in dotted outline in Figure 4 and has an upward extension at 154 for release purposes and a hook-like extension at 156 for retaining the bread carrier in a "keep-warm" position. The extension 154 is adapted to engage the latch 54 and swing it toward the right when the knob 140 is pushed inwardly whereas the hooked lug 156 is adapted to extend over a flange 158 of the bread carrier extension 20 as shown in Figure 7 when the knob is pulled outwardly. In Figure 4 it will be noted that the extension 154 is out of engagement with the latch 54 and the hooked lug 156 is out of alignment with the flange 158 so that clockwise rotation of the lever 150 will unlatch the latch or counter-clockwise rotation will swing the hook 156 over the flange 158.

Referring again to Figure 7, it is obvious that when the latch 54 is released, the bread carrier will commence to rise but if the hook 156 is over the flange 158, it will rise only a short distance. This distance is sufficient to open the main switch but retain the toast well down in the toaster instead of elevating it to a position where it can be removed. Subsequently when it is desirable to remove the toast, the knob 140 is pushed inwardly for unlatching the latch.

Upon running a series of tests to determine the actual bread temperature as the toast reaches a medium color, I found that a surprisingly uniform temperature reading is had each time regardless of whether the toaster was hot from previous toasting or not. There is a radical rate of change in the surface temperature of the toast as it starts and continues to brown and by taking advantage of the surface temperature of the toast by means of the wires 86 and 88 in contact therewith, I am able to provide a very satisfactory cycle-terminating means which produces substantially uniform toast color in successive cycles without having to compensate for ambient rise of temperature within the toaster. A very simple means has been disclosed to sense the surface temperature of the toast and convert the temperature into movement for actuating the necessary mechanism to automatically terminate the toasting period.

Instead of the arrangement thus far disclosed, the latch 54 may be released by means of a thermal motor or an electromagnet, the latter being shown in Figure 12 consisting of a switch 72a—74a which is normally open instead of normally closed and shunts the heating element HE in series with an electromagnetic coil 60a adapted to actuate a plunger 60b which in turn would release the latch 54 in place of the bimetal element 60 of Figure 11. The switch blade 72a of course would be moved to the closed position by the lever end 104 and it is thus obvious that the lever may be used in different ways for accomplishing the same end result. Also the lever end 104 may be used to directly engage the latch 54 if the parts are carefully balanced mechanically but I find it a little more reliable to depend on the lever end 104 merely as a pilot to cause actuation of a latch releasing means which is powered electrically or by other sources of energy.

The arrangement disclosed in Figure 12 makes the main switch 68—70 effective to de-energize the relay once it has acted to release the bread carrier. Thus the relay is only momentarily energized to insure against it becoming overheated and making possible the use of a relatively small relay.

Some changes may be made in the construction and arrangement of the parts of my temperature actuated control without departing from the real spirit and purpose of my invention, and it is my intention to cover by my claims any modified forms of structure or use of mechanical equivalents which may be reasonably included within their scope.

I claim as my invention:

1. A bread toaster comprising bread slice heating means, a bread carrier for carrying a bread slice to a position to receive heat from said heating means, toasting interval control means including a pair of thermal responsive elements having differing coefficients of expansion, said elements engaging the bread slice to respond to the surface temperature thereof, a lever, said thermal responsive elements being connected at spaced points to said lever, a spring connected to said lever between said spaced points whereby to pivot the lever, latch means for holding the bread carrier in toasting position, and latch releasing means operated by said lever when the bread attains a surface temperature corresponding to the desired color of toast.

2. A bread toaster comprising heating means, a bread carrier for carrying a slice of bread to a position to receive heat from said heating means, automatic control means including a pair of thermal responsive elements engaging the bread slice to respond to the surface temperature thereof, one of said elements having a greater coefficient of expansion than the other, a lever, said elements being connected at spaced points to said lever, a spring connected to said lever between said spaced points whereby to pivot the lever, latch means for holding the bread carrier in toasting position, and latch releasing means engaged and operated by said lever as it is moved in response to temperature rise.

3. Toaster timing mechanism comprising a pair of wires anchored at one end and having a thermal expansion differential operable to lengthen one wire more than the other when they are heated, means for holding a slice of bread with its surface in contact with said wires whereby the wires respond to the surface temperature of the bread as it is toasted, a lever connected with the other ends of said wires, the connection of the wires thereto being spaced, a pivot between said connections, spring means biasing said anchored ends of said wires and said pivot relatively away from each other whereby the lever swings in one direction upon temperature rise of the toast surface, and means actuated by said lever for terminating a toasting cycle.

4. Toaster timing mechanism comprising a pair of wires having a thermal expansion differential operable to lengthen one wire more than the other when they are heated, means for holding a slice of bread in surface contact with said wires, a lever connected with said wires, the connection of the wires thereto being spaced, a pivot between said connections, spring means biasing said pivot in the general direction of expansion of said wires whereby the lever swings in one direction upon temperature rise of the toast surface, means for latching a bread carrier of the toaster in toasting position, a thermal motor for releasing said latch when the motor is heated by the passage of electric current therethrough, and a shunt switch for said latch, said switch being opened by said lever when swung in said one direction.

5. Toaster timing mechanism comprising a pair of wires having a thermal expansion differential operable to lengthen one wire more than the other when they are heated, means for holding a slice of bread in surface contact with said wires, a lever connected with said wires, the connection of the wires thereto being spaced, a pivot between said connections, spring means biasing said pivot in the general direction of expansion of said wires whereby the lever swings in one direction upon temperature rise of the toast surface, means for latching a bread carrier of the toaster in toasting position, a thermal motor for releasing said latch when the motor is heated by the passage of electric current therethrough, and switch means operable to energize said thermal motor and actuated by said lever, when swung in said one direction.

6. Toaster timing mechanism comprising a pair of wires having a thermal expansion differential operable to lengthen one wire more than the other when they are heated, means for holding a slice of bread in surface contact with said wires, a lever connected with said wires, the connection of the wires thereto being spaced, a pivot between said connections, a spring connected with said pivot whereby the lever swings in one direction upon temperature rise of the toast surface, means for latching a bread carrier of the toaster in toasting position, a thermal motor for releasing said latch when the motor is heated by the passage of electric current therethrough, a shunt switch for said latch, said switch being opened by said lever when swung in said one direction, a mounting for said shunt switch, and means for adjusting said mounting away from said lever to increase the travel of the lever before it opens said shunt switch.

ALFRED J. HUCK.

REFERENCES CITED

The following references are of record in the file of this patent:

UNITED STATES PATENTS

| Number | Name | Date |
|---|---|---|
| 48,607 | Washburn | July 4, 1865 |
| 1,156,417 | Lincoln | Oct. 12, 1915 |
| 1,540,628 | Hurxthal et al. | June 2, 1925 |
| 2,076,774 | Graham | Apr. 13, 1937 |
| 2,099,210 | Ireland | Nov. 16, 1937 |
| 2,203,719 | Crane | June 11, 1940 |
| 2,301,070 | Myers | Nov. 3, 1942 |